2,965,673
IODOTOLYL BENZOATES

Laurence A. Pursglove, Midland, Mich., assignor to The Dow Chemical Company, Midland, Mich., a corporation of Delaware No Drawing. Filed Sept. 3, 1958, Ser. No. 758,674

3 Claims. (Cl. 260—476)

The present invention is concerned with aromatic esters of benzoic acid and is particularly directed to certain novel α-iodo-o-tolyl benzoates and substituted benzoates corresponding to the formula

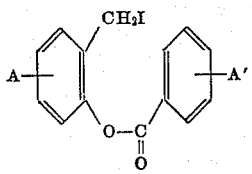

In this and succeeding formulas herein, each of A and A' is independently selected from the group consisting of hydrogen, nitro, chlorine, and bromine.

These compounds are crystalline solids soluble in many common organic solvents such as chlorinated hydrocarbons, lower alkanols, and lower alkyl ethers, but of very limited solubility in water. The present compounds are useful as parasiticides and are adapted to be employed to control certain pathogenic bacteria, insects such as flies and cockroaches, and certain fungi which account for the decomposition and spoilage of many materials such as wood, leather, fabric, and the like.

The compounds of the present invention may be conveniently prepared in a simple metathetical reaction between an α-chloro-o-tolyl benzoate corresponding to the formula

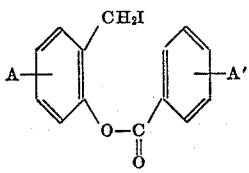

and sodium iodide. In such preparation, the reaction is advantageously carried out in acetone as liquid reaction medium. The reaction takes place smoothly at temperatures of from about 0° C. to about 60° C., with the production of the desired product and sodium chloride of reaction. Good results are obtained when the sodium iodide and α-chloro-o-tolyl benzoate reactant are employed in equimolecular proportions.

In carrying out the present preparation, the α-chloro-o-tolyl benzoate reactant is intimately mixed and blended with sodium iodide dispersed in acetone. The resulting dispersion is heated, under reflux if desired, at a temperature in the range of from 0° C. to about 60° C. which may advantageously be the boiling temperature, to produce the desired product. Sodium chloride of reaction is formed and usually precipitates in and may be separated from the reaction mixture leaving an organic solution of the desired α-iodo-o-tolyl benzoate product. The product may be separated from the resulting solution by known procedures such as, for example, removal of solvent by vaporization, and recrystallization of the resulting product.

The following examples illustrate the invention but are not to be construed as limiting it.

*Example 1.—α-Iodo-o-tolyl benzoate*

α-Chloro-o-tolyl benzoate (49.2 grams; 0.2 gram mole) was added to a dispersion of 30 grams (0.2 gram mole) sodium iodide in 200 milliliters acetone. The resulting reaction mixture was heated at the boiling temperature, approximately 58° C., and under reflux, for one hour. During the course of the heating, the desired α-iodo-o-tolyl benzoate product was produced, and sodium chloride of reaction formed as a crystalline precipitate in the reaction mixture from which it was thereafter removed by filtration. The resulting α-iodo-o-tolyl benzoate solution was vaporized to remove acetone solvent and leave a crude product. The resulting crude product was taken up in 95 percent ethanol and, by recrystallization there was obtained a purified α-iodo-o-tolyl benzoate product melting at 74.5–75.5° C.

In a further preparation in the manner of Example 1, there is prepared an α-iodo-4-chloro-o-tolyl benzoate. In yet another preparation in the manner of Example 1 there is prepared a crude α-iodo-o-tolyl p chlorobenzoate. In other preparations carried out in the manner of Example 1, the following products are prepared:

By reacting 5-nitro-α-chloro-o-tolyl benzoate with sodium iodide, a 5-nitro-α-iodo-o-tolyl benzoate.

By reacting 4-bromo-α-chloro-o-tolyl benzoate with sodium iodide, a 4-bromo-α-iodo-o-tolyl benzoate.

By reacting 4-bromo-α-chloro-o-tolyl 4-bromobenzoate with sodium iodide, a 4-bromo-α-iodo o-tolyl 4-bromobenzoate product.

Other compounds of this invention are prepared as follows:

By reacting 4 - chloro - α - chloro-o-tolyl-3-chlorobenzoate and sodium iodide, a 4-chloro-α-iodo-o-tolyl 3-chloro benzoate product;

By reacting a p-nitro-α-chloro-o-tolyl benzoate with sodium iodide, a p-nitro-α-iodo-o-tolyl benzoate.

The compounds of the present invention are useful as insecticides, and especially in the control of pathogenic bacteria. For such use, the unmodified compounds may be used. Alternatively, the compounds may be dispersed on an inert finely divided solid and the resulting preparation employed as a dust. Also, such preparations may be dispersed in water with or without the aid of a wetting agent and the resulting aqueous suspensions employed as sprays. In other procedures, the compounds may be employed in oil or other solvent or as a constituent of solvent-in-water or water-in-solvent emulsions or as aqueous dispersions thereof which may be applied as spray, drench, or wash. In a representative operation, a nutrient agar containing 3 grams beef extract, 5 grams peptone, and 15 grams agar per liter of prepared agar gel was inoculated with *Staphylococcus aureus*, and a like agar modified by the inclusion therein of 0.01 percent by weight of prepared agar of α-iodo-o-tolyl benzoate was similarly inoculated. These were then incubated for a period of time under identical conditions. As a result of these operations, the agar containing the benzoate of the present invention showed complete inhibition of the *Staphylococcus aureus*, whereas the agar without the present compound showed vigorous growth and reproduction of the microorganism.

The α-chloro-o-tolyl benzoate starting materials employed in the practice of the present invention are prepared in the manner shown in my copending application Number 758,673, filed even date herewith. In the process described in that application, the corresponding o-tolyl benzoate is chlorinated at temperatures between 20° and 150° C., in the presence of a phosphorus chloride catalyst, employing two atomic equivalents of chlorine for each molecular equivalent of benzoate reactant, and the resulting product is purged with an inert gas to obtain the crude α-chloro-o-tolyl benzoate, which may be further purified. Various modifications of the process and products of the present invention may be made without departing from the spirit or scope thereof, and it is to be understood that I limit myself only as defined in the appended claims.

I claim:
1. A compound corresponding to the formula:

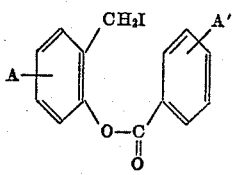

wherein each of A and A' is independently selected from the group consisting of hydrogen, bromine, chlorine, and a nitro group.

2. α-Iodo-o-tolyl benzoate.
3. 4-nitro-α-iodo-o-tolyl benzoate.

References Cited in the file of this patent
UNITED STATES PATENTS

| | | |
|---|---|---|
| 2,073,316 | Niederl | Mar. 9, 1937 |
| 2,097,137 | Smith et al. | Oct. 26, 1937 |
| 2,906,780 | Hirsehmann et al. | Sept. 29, 1959 |
| 2,918,490 | Bible et al. | Dec. 22, 1959 |

OTHER REFERENCES

Jacobs et al.: J. Biol. Chem., 20, 672-3 (1915).
Segusser: J. Am. Chem. Soc., 64, 825-6 (1942).
Helferich et al.: Ber., 83, 569-70 (1950).
Goldberg et al.: J. Chem. Soc., 2540-1 (1954).